United States Patent [19]

King et al.

[11] 4,125,916
[45] Nov. 21, 1978

[54] TOOL FOR REMOVING INSULATING MATERIAL FROM ELECTRICAL CONDUCTORS

[75] Inventors: Joseph S. King, Upper Arlington; Robert L. Huber, Columbus, both of Ohio

[73] Assignee: McGraw-Edison Company, Elgin, Ill.

[21] Appl. No.: 759,655

[22] Filed: Jan. 17, 1977

[51] Int. Cl.² .................... A46B 13/02; H02G 1/12; A46L 25/00
[52] U.S. Cl. .................................. 15/23; 15/88; 81/9.5 R
[58] Field of Search .................. 51/170 R, 170 PT; 15/23, 88; 81/9.5 R, 9.51

[56] References Cited

U.S. PATENT DOCUMENTS

| 875,824 | 1/1908 | Knisely | 51/170 R |
|---|---|---|---|
| 3,187,361 | 6/1965 | Wheeler | 15/23 |
| 3,447,177 | 6/1969 | Williams et al. | 81/9.51 X |
| 3,739,415 | 6/1973 | Larson | 15/23 |

FOREIGN PATENT DOCUMENTS 662,533  5/1963  Canada .............................. 51/170 PT Primary Examiner—Harold D. Whitehead
Assistant Examiner—Roscoe V. Parker
Attorney, Agent, or Firm—Jon Carl Gealow; Thomas E. McDonald; Ronald J. LaPorte

[57] ABSTRACT

A power-driven tool for cleaning insulation and corrosion from conductors is portable and applies a controlled pressure established by hand. The tool employs a motor-driven abrasive drum and a pressure pad movable toward and away from the abrasive drum, with the conductor being squeezed between the pad and the drum during operation. A control for the motor is activated by the motion of the pressure pad toward the drum beyond a preestablished point, and an adjustable stop estalishes a minimum spacing between the pressure pad and the abrasive drum. A shroud covers the drum at all points except for an exposed area between the drum and the pressure pad, and a bias spring urges the pressure pad away from the drum to stop the motor upon release by the operator.

12 Claims, 4 Drawing Figures

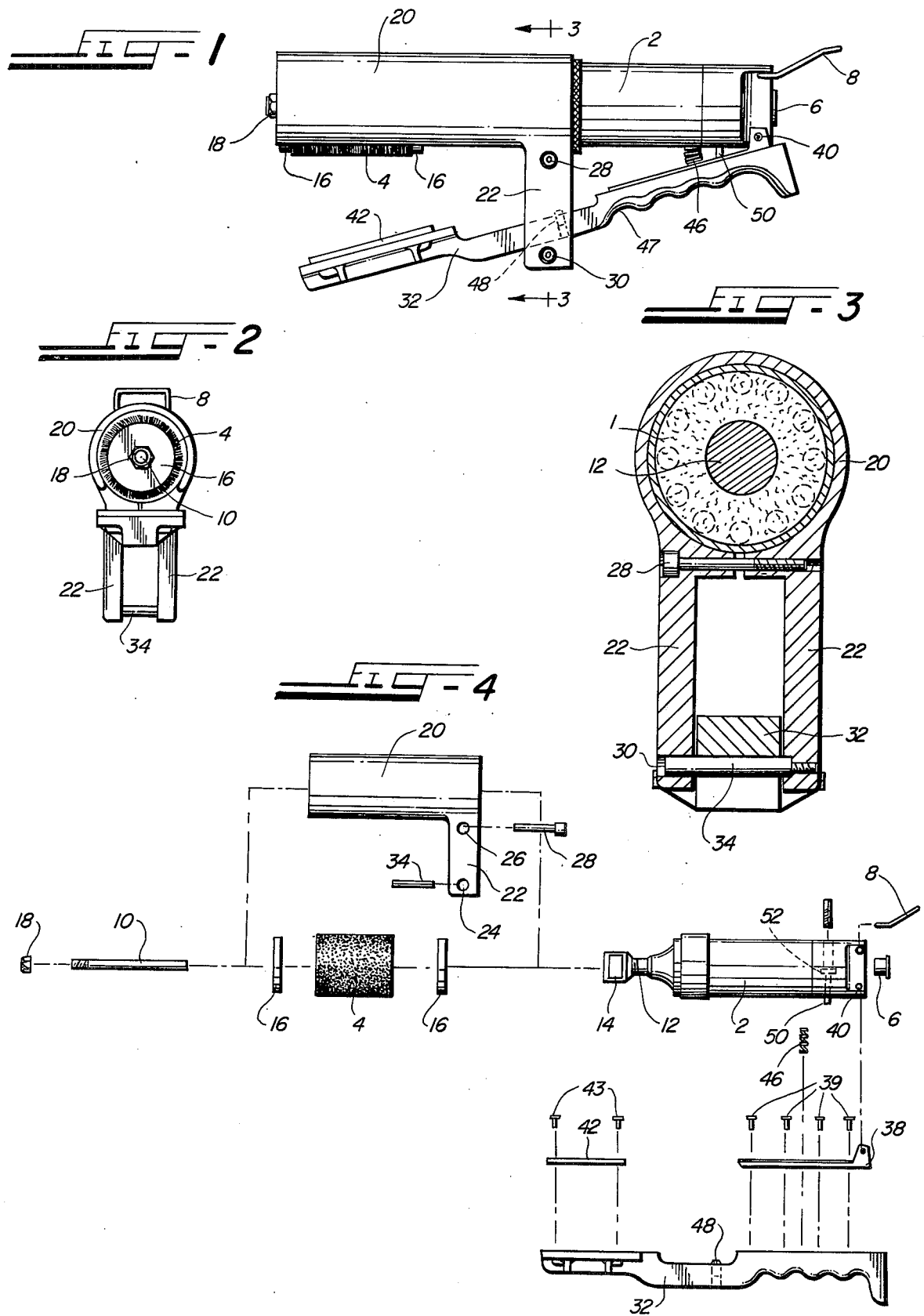

TOOL FOR REMOVING INSULATING MATERIAL FROM ELECTRICAL CONDUCTORS

BACKGROUND OF THE INVENTION

1. Field of the Invention

The present invention relates generally to a device for removing insulation and corrosion from electrical conductors, and more specifically, the present invention relates to a portable hand-held pneumatic tool for removing insulating materials from conductors such as those used in large electrical devices and of generally rectangular cross section.

2. Description of the Prior Art

In working with electrical equipment, it is frequently necessary to remove from a designated portion of current-carrying conductors insulating material, which may be either an applied insulation or an incidental form of insulation, such as corrosion, dirt, or residual adhesive from electrical tape. In certain operations, such as the manufacture or repair of the electrical equipment, removal of these forms of insulation is necessary to prevent interference with good electrical connections, and perhaps good mechanical connections, such as a weld.

From the earliest methods of manual abrasion, such as wire brushing, mechanical abrasion methods have been developed. However, these mechanical abrasion methods involved bringing the conductor to be stripped of insulating material to an established station, which frequently imposed a considerable burden. Accordingly, efforts have been made to devise a portable stripping tool which may be easily conveyed to a desired work area. Such attempts at providing a portable tool have employed unprotected, rapidly spinning abrasive wheels or brushes which are prone to unintentional contact with nearby objects. Among the hazards of such a structure are that the spinning wheel may injure the thing accidentally contacted, such as the operator's hand, and that the wheel may capture a particle and fling it in an unpredictable direction.

In addition to being hazardous, prior art tools require the operator to position the conductor either between two rotating abrasive wheels or between a rotating abrasive wheel and a rotatable positioning wheel. In either case, the conductor is not held in place by contact with a fixed element. The frictional force applied to the conductor by the abrasive wheel results in a force tending to dislocate the conductor from its intended position. If the operator does not possess sufficient dexterity or strength to prevent this movement, the conductor may be ejected from its working position, insulation may be removed from undesired areas, or, worse, part of the conductor itself may be worn away. Such a lack of controlled stripping pressure renders prior art portable stripping tools less useful than desired.

Other desirable features of a portable stripping tool, besides safety and a controlled pressure to prevent grabbing and uneven abrasion, include small size to reach areas of limited accessability, ease of hand operation in such limited accessability areas, motor control integrated with establishment of stripping pressure, and evenness of the stripping pressure. While some prior art devices have attempted to provide some of these features, there is no prior art tool that can provide all of these desired results.

SUMMARY OF THE INVENTION

The present invention eliminates many of the previously mentioned defects and inefficiencies of the prior art and significantly reduces the detrimental aspects of the others.

In the preferred embodiment of the tool of this invention disclosed herein, a power source or motor, such as a pneumatic motor driven by compressed air, is utilized. Such a motor possesses the advantages of being light in weight relative to electric motors of comparable power; of allowing speed variation by means of a simple valve, rather than a current regulator, as in electric motors; of stopping rotation much faster when the air current is shut off than an electric motor when its current is shut off; of eliminating the danger of electric shock to the user; and of eliminating the electric arc present inside an electric motor, thus allowing use in an environment containing flammable gases or dust. This motor is mounted in an appropriate housing, such as a generally cylindrical motor housing having an air inlet at one end thereof.

Removably attached to the shaft of this pneumatic motor is an abrasive drum or cylinder, such as a wire brush, for removing the undesired insulating material. This abrasive drum is almost completely surrounded by a generally cylindrical shroud which prevents its contact with surfaces which are not to be contacted, and, in the event that the drum dislodges sizable particles, the shroud reduces the area from which these particles can be flung into the surrounding area. The shroud is mounted coaxially with the motor housing and is integrally connected therewith.

A pressure pad is removably mounted in a fixed position on a supporting arm, which is pivotably mounted on the motor housing adjacent the end of the motor housing having the air inlet. A hand grip is formed on the supporting arm opposite the motor housing to permit the supporting arm to be pivoted by hand pressure to move the pressure pad toward and away from the abrasive drum. A bias spring urges the supporting arm away from the integrally connected motor housing and shroud, and guide flanges with a cross bar connected therebetween define the path of motion of the supporting arm and limit its displacement under the force of the bias spring as well as protecting the user's hand.

A valve for controlling the pneumatic motor has an actuating pin extending through the motor housing for engagement and displacement by the supporting arm when the pressure pad is moved within a preestablished distance from the abrasive drum. Also, an adjustable stop located on the supporting arm limits the minimum spacing between the pressure pad and the abrasive drum to a predetermined value.

Accordingly, applicant's invention provides a tool capable of removing insulation and corrosion from conductors in a safe and rapid manner. The tool is easily portable and may be utilized in areas to which access is limited. A controlled stripping pressure is applied by hand action, and energization of the abrasive drum is achieved only when stripping action is desired.

These and other objects, advantages and features of this invention will hereinafter appear, and for purposes of illustration, but not of limitation, an exemplary embodiment of the subject invention is shown in the appended drawing.

BRIEF DESCRIPTION OF THE DRAWING

FIG. 1 is a side elevational view of a preferred embodiment of the present invention.

FIG. 2 is a front elevational view of the preferred embodiment of FIG. 1.

FIG. 3 is an enlarged cross-sectional view taken along line 3—3 of FIG. 1.

FIG. 4 is an exploded view of the preferred embodiment of FIG. 1.

DETAILED DESCRIPTION OF THE PREFERRED EMBODIMENT

A conventional pneumatic motor 1 is located in a motor housing 2, such as a generally cylindrical steel casing. The pneumatic motor 1 is used to drive an abrasive drum 4, such as a generally cylindrical wire brush.

Pressurized air to supply power to the pneumatic motor 1 is admitted at an inlet port 6, located at the rear of the motor housing 2. A hook 8 may be fastened to the motor housing 2 to facilitate storage, as by hanging, or transportation of the device, as on a belt loop.

A cylindrical drive shaft 10 of suitably strong material, such as steel, is fastened to the motor's revolving shaft 12 by a coupling chuck 14, which can be any such chuck commonly used to connect revolving shafts of small machinery, yet allowing easy uncoupling for repairs. The abrasive drum 4 is removably fastened to the drive shaft 10, between two bushings 16, also on the drive shaft 10, and by a nut 18. Nut 18 is preferably the self-locking type, the locking action of which is caused by a plastic insert which rests against the drive shaft's threads, although any suitable locking arrangement for nut 18 will suffice. Abrasive drum 4 is constrained to rotate with drive shaft 10, due to the fact that abrasive drum 4 is tightly squeezed between chuck 14 and nut 18 when the nut is tightened. This configuration is preferred because it provides a certain automatic clutching function in the respect that if the revolving drum should suddenly be stopped, the torque of the shock will be diminished by the motor's continuing to rotate. Also, if an electric motor is used the possibility of burning out the motor if drum 4 should be forcibly stopped is reduced, because the motor can continue to rotate. Further, this method of attachment allows the use of drum 4 of various lengths, because suitable bushings can be used to take up any excess space along the shaft. In addition, this method of attachment allows drum 4 to be reversed 180°. However, it is clear that other methods of drum attachment may be used.

The abrasive drum 4 is preferably a generally cylindrical brush with stiff wire bristles. The brush is symmetrical so that it can be turned 180° on the drive shaft by means of the frictional drive shaft attachment to increase its useful life, in view of the well-known fact that the bristles of revolving wire brushes tend to deform when rotated in one direction only. The reversible nature of the preferred brush will allow any bending effect to be counteracted by bending in the opposite direction when reversed. Of course, the use of other types of abrasive drums is contemplated, as well as the possibility of a non-rotating abrasive motion.

Integrally connected to the motor housing 2 is a shroud 20. The shroud is of generally cylindrical shape with a diameter slightly larger than that of the abrasive drum 4, and constructed preferably of a rigid material, such as steel. Extending from the shroud 20 are two guide flanges 22. Two holes 24 and 26 are drilled through the flanges, and these holes are threaded to accept bolts 28 and 30. This combination of the bolts 28 and 30 and flanges 22 serves several purposes. The configuration of the combination should be such that, as in FIG. 3, the tightening of the bolts 28 and 30 will contract shroud 20 around the motor housing 2 to fixedly connect shroud 20 and motor housing 2. Of course, other methods of fastening the shroud 20 to the motor housing 2 may be used. Also, the bolt 30 serves as a cross bar to limit the rotation of a supporting arm 32. In this respect, it is preferred that the threads of bolt 30 be protected by a sleeve 34 to prevent damage upon bolt 30 being struck by supporting arm 32. Further, the flanges 22, when positioned by the tightening of the bolts 28 and 30, act as a guide for defining the path of travel of supporting arm 32, limiting its transverse motion. Still further, the flanges 22 serve to prevent the operator's hand from sliding forward into the area of abrasion and, conversely, prevent the conductor from contacting the operator's hand. It is, of course, not necessary that the flanges be made from the same piece of material as the shroud, and other configurations are contemplated, as well as other placements for flanges 22.

Supporting arm 32 is fastened to a supporting arm mounting plate 38, preferably by screws 39 as in FIG. 4, and mounting plate 38 is pivotally hinged to the motor housing 2 by an appropriate pivot mounting 40. Supporting arm 32 is positioned between flanges 22 and has, at its end opposite that of pivot attachment 40, a pressure pad 42 removably fastened to it, preferably by screws 43 as in FIG. 4, in a fixed position. The supporting arm 32 and mounting plate 38 are preferably constructed of a strong, rigid material, such as steel, while the pressure pad is preferably constructed of a more plastic material (the material sold under the trademark "TEFLON" by Du Pont has been successfully used in this application). Since the materials providing the greatest frictional holding power are generally soft and easily damaged, while the harder materials possess less frictional potential, the composition of the pressure pad 42 will be a compromise between the two types of material.

The pressure pad 42 and supporting arm 32 are constructed so that the pressure pad has a flat surface facing the abrasive drum 4, and this surface is always perpendicular to the vertical, longitudinal plane extending from the longitudinal axis of the drum. As pressure pad 42 is brought to its operative position near abrasive drum 4, the pressure pad preferably will approach and reach a position parallel to one of the planes of tangency of the surface of the drum.

A spring 46 located near the pivot point 40 urges supporting arm 32 away from the integrally connected shroud 20 and motor housing 2, and hence pressure pad 42 away from drum 4. The spring 46 should be of strength sufficient to keep supporting arm 32 away from motor housing 2 when the tool is not in use, yet capable of compression by an operator's hand when he squeezes the tool driving operation. For this purpose, a hand grip 47 is formed on supporting arm 32 opposite motor housing 2. Rotation of the supporting arm 32 toward motor housing 2, and hence motion of pressure pad 42 toward abrasive drum 4, is limited by an adjustable stop 48. Adjustable stop 48 may be utilized to limit the maximum stripping pressure to be applied for a given conductor size by not permitting pressure pad 42 to come closer than a preestablished distance from abrasive drum 4.

Automatic control for energization of pneumatic motor 1 is provided by a valve actuating pin 50 and a valve structure 52. Pin 50 is mounted for reciprocable motion, so that as pressure pad 42 is urged toward abrasive drum 4, pin 50 will be displaced to actuate the valve 52 upon pressure pad 42 coming within a predetermined distance from drum 4. Further, when the action of spring 46 causes pressure pad 42 to be separated from drum 4 by more than the predetermined distance, valve 52 closes and the motor 1 and abrasive drum 4 cease rotating.

With the preceding detailed description in view, the operation of the invention may be explained: the operator places the conductor to be stripped between the pressure pad and the abrasive drum, and then rotates supporting arm 32 by placing his hand around the motor housing 2 and hand grip 47 and squeezing. As the conductor is thus forced toward the drum, valve 52 is activated, causing the drum 4 to spin, and when the conductor contacts the drum, the insulation is worn away. Upon release of supporting arm 32 by the operator, either intentionally or by accident, the motor 1 stops, thus preventing the rotating drum 4 from inflicting accidental damage.

It should be understood that various modifications, changes and variations may be made in the arrangement, operation and details of construction of the elements disclosed herein without departing from the spirit and scope of this invention.

We claim:

1. A hand-held portable device for stripping undesired material from a conductor and comprising:
   an abrasive member mounted for motion in a fashion to yield the desired stripping action;
   a motor mounted in the device to drive said abrasive member with the desired motion;
   a supporting arm;
   a pressure pad fixedly mounted on said supporting arm opposite said abrasive member with the conductor insertable therebetween, said pressure pad and said abrasive member being movable toward and away from one another by hand imparted force with said pressure pad being mounted on said supporting arm in a position to maintain contact between said abrasive member and the conductor and to prevent or retard movement of said device relative to the conductor; and
   motor control means to cause energization of said motor only when said pressure pad and said abrasive member are brought within a preestablished distance from one another.

2. A device as claimed in claim 1 and further comprising stop means for limiting the spacing between said pressure pad and said abrasive member to a predetermined minimum distance.

3. A device as claimed in claim 1 wherein:
   said abrasive member is a rotating drum;
   said motor is mounted in a generally cylindrical housing;
   said abrasive drum is mounted coaxially with said motor housing; and
   said supporting arm is pivotally mounted adjacent the end of said motor housing farther from said abrasive drum.

4. A device as claimed in claim 3 and further comprising an annular, generally cylindrical shroud enclosing said abrasive drum, an opening being formed in said shroud on the side toward said pressure pad to permit said drum to extend beyond said shroud toward said pressure pad.

5. A device as claimed in claim 4 wherein:
   said motor housing and said shroud are fixedly connected;
   bias means urging said supporting arm away from said motor housing and shroud;
   guide means extending from said motor housing and shroud to direct the path of motion of said supporting arm and limit the maximum displacement of said pressure pad from said abrasive drum; and
   a hand grip is formed on said supporting arm opposite said motor housing to provide for pivoting of said supporting arm by an operator applying hand pressure between said supporting arm and said motor housing to move said pressure pad toward said abrasive drum.

6. A device as claimed in claim 3 wherein said abrasive drum is a generally cylindrical wire brush.

7. A device as claimed in claim 3 wherein:
   said motor is a pneumatic motor; and
   said motor control means comprises valve means having an actuating pin extending through said motor housing to be displaced by said supporting arm when said pressure pad is brought within said preestablished distance from said abrasive drum.

8. A hand-held pneumatic tool for removing insulating material from electrical conductors of rectangular cross-section and comprising:
   a motor housing;
   a pneumatic motor contained in and attached to said motor housing;
   an abrasive drum connected to and driven by said motor;
   a shroud surrounding substantially all of said abrasive drum and connected to said motor housing;
   a supporting arm pivotally connected to said motor housing;
   a pressure pad removably mounted in a fixed position on said supporting arm, said supporting arm being pivotable by hand pressure to position said pressure pad varying distances from an exposed portion of the abrasive drum, said pressure pad being mounted on said supporting arm in a position to maintain contact between said abrasive member and the coductor and to prevent or retard movement of said device relative to the conductor; and
   valve means which activate said motor when said pressure pad is positioned within a preestablished distance from said exposed drum portion and which deactivate said motor when said pressure pad is positioned farther than said preestablished distance from said exposed drum portion.

9. A pneumatic tool as claimed in claim 8 and further comprising stop means to limit the spacing between said pressure pad and said abrasive drum to a predetermined minimum distance.

10. A pneumatic tool as claimed in claim 8 and further comprising:
    a bias spring to urge said pressure pad away from said exposed drum portion;
    guide flanges extending from said shroud to define the path of motion of said supporting arm; and
    a cross bar between said guide flanges to limit the separation between said pressure pad and the exposed portion of said drum achieved under the urging of said bias spring.

11. A pneumatic tool as claimed in claim 8 wherein said abrasive drum is a wire brush.

12. A hand-held portable tool for stripping insulating material from a conductor and comprising:
- a generally cylindrical motor housing;
- a pneumatic motor mounted for rotation in said motor housing;
- an inlet at one end of said motor housing for the insertion of air to drive said motor;
- valve means in the tool to determine the application of driving air to said pneumatic motor;
- a shaft extending from the end of said motor housing opposite said inlet, said shaft being rotated by said motor;
- a generally cylindrical wire brush removably mounted on said shaft, said wire brush being coaxial with said motor housing;
- an annular, generally cylindrical shroud enclosing said wire brush, said shroud and said motor housing being fixedly connected in coaxial alignment;
- a supporting arm pivotally mounted on said motor housing adjacent the end thereof having said inlet;
- a pressure pad removably mounted in a fixed position on said supporting arm adjacent the end of said supporting arm away from said pivotal mounting, said pressure pad being located opposite said wire brush and selectively movable toward and away from said wire brush;
- an opening formed in said shroud on the side toward said pressure pad to permit a conductor placed between said pressure pad and said wire brush to be brought into contact with said wire brush as a result of a force being applied to the conductor by said pressure pad;
- a hand grip formed in said supporting arm opposite said motor housing to permit said pressure pad to be urged toward said wire brush by an operator applying hand pressure between said motor housing and said hand grip to rotate said supporting arm;
- an adjustable stop member located on said supporting arm to determine a minimum separation between said pressure pad and said wire brush;
- a compression spring to urge said supporting arm away from the motor housing and shroud;
- a pair of guide flanges extending from said shroud to define the path of motion of said supporting arm;
- a cross bar between said guide flanges to limit the rotation of said supporting arm away from the integrally connected shroud and motor housing under the force of said compression spring; and
- a reciprocable actuating pin extending through said motor housing to be displaced by said supporting arm, when said pressure pad is brought within a preestablished distance from said wire brush, to actuate said valve means to energize said pneumatic motor.

* * * * *